United States Patent
Suzuki

(10) Patent No.: US 7,880,908 B2
(45) Date of Patent: Feb. 1, 2011

(54) PRINT SYSTEM, IMAGE SENSING APPARATUS, PRINT APPARATUS, AND CONTROL METHODS THEREOF

(75) Inventor: Takayuki Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 987 days.

(21) Appl. No.: 11/688,484

(22) Filed: Mar. 20, 2007

(65) Prior Publication Data

US 2007/0229875 A1 Oct. 4, 2007

(30) Foreign Application Priority Data

Mar. 29, 2006 (JP) ............................ 2006-092337
Feb. 22, 2007 (JP) ............................ 2007-042681

(51) Int. Cl.
*G06F 15/00* (2006.01)
*B41J 3/36* (2006.01)

(52) U.S. Cl. ...................................... 358/1.14; 347/109

(58) Field of Classification Search ................ 358/1.14, 358/1.15, 1.13, 1.16, 1.18, 1.6, 1.7, 1.8, 1.12, 358/535, 529, 1.17; 347/7, 9, 93, 108, 116, 347/200; 235/491, 375, 494, 472.01; 400/88, 400/248, 578; 455/556.1, 556.2, 411, 558, 455/557

See application file for complete search history.

(56) References Cited

U.S. PATENT DOCUMENTS

2004/0126089 A1  7/2004  Suzuki ........................ 386/46
2004/0184043 A1* 9/2004  Hirosugi et al. .............. 358/1.1

FOREIGN PATENT DOCUMENTS

JP      2003-191577        7/2003

\* cited by examiner

*Primary Examiner*—Saeid Ebrahimi Dehkordy
(74) *Attorney, Agent, or Firm*—Fitzpatrick, Cella, Harper & Scinto

(57) ABSTRACT

A print apparatus which prints image data on a recording sheet, comprises a first calculation unit adapted to calculate the number of printable sheets from a battery remaining amount of the print apparatus, a second calculation unit adapted to calculate the number of printable sheets from a recording sheet remaining amount or ink remaining amount, a determination unit adapted to determine the number of sheets printable by the print apparatus based on the number of printable sheets calculated by the first calculation unit and the number of printable sheets calculated by the second calculation unit, and a display unit adapted to display the number of printable sheets determined by the determination unit.

20 Claims, 19 Drawing Sheets

FIG. 4

BATTERY REMAINING AMOUNT
REQUIRED FOR PRINTING OF
ALL IMAGES IS RUNNING SHORT.
DO YOU WANT TO CONTINUE PRINTING?

NUMBER OF PRINT DESIGNATED SHEETS: 12

NUMBER OF PRINTABLE SHEETS: 10

| OK | CANCEL |

FIG. 5

REMAINING AMOUNTS OF RECORDING SHEETS
AND/OR INK REQUIRED FOR PRINTING OF
ALL IMAGES ARE RUNNING SHORT.
NEW RECORDING SHEETS
AND/OR REPLACEMENT CARTRIDGE
ARE NECESSARY.

NUMBER OF PRINT DESIGNATED SHEETS: 12

NUMBER OF PRINTABLE SHEETS: 10

OK        CANCEL

FIG. 7

REMAINING AMOUNTS OF RECORDING SHEETS AND/OR INK REQUIRED FOR PRINTING OF ALL IMAGES ARE RUNNING SHORT. NEW RECORDING SHEETS AND/OR REPLACEMENT CARTRIDGE ARE NECESSARY.

NUMBER OF PRINT DESIGNATED SHEETS: 12

NUMBER OF PRINTABLE SHEETS: 10

OK    CANCEL

RE-SET

FIG. 8

BATTERY REMAINING AMOUNT IS
RUNNING SHORT.
YOU CANNOT DESIGNATE
IMAGES ANY MORE.

NUMBER OF PRINT DESIGNATED SHEETS: 10

NUMBER OF PRINTABLE SHEETS: 10

PRINT ON CURRENTLY
DESIGNATED NUMBER OF SHEETS

CANCEL

FIG. 9

REMAINING AMOUNTS OF RECORDING SHEETS
AND/OR INK ARE RUNNING SHORT.
NEW RECORDING SHEETS
AND/OR REPLACEMENT
CARTRIDGE ARE NECESSARY.

NUMBER OF PRINT DESIGNATED SHEETS: 10

NUMBER OF PRINTABLE SHEETS: 10

PRINT ON CURRENTLY
DESIGNATED NUMBER OF SHEETS

CANCEL

CONTINUE IMAGE
DESIGNATION

PRINT SYSTEM, IMAGE SENSING APPARATUS, PRINT APPARATUS, AND CONTROL METHODS THEREOF

BACKGROUND OF THE INVENTION

1. Field of the Invention

The present invention relates to a technique for causing a printer to directly print an image stored in a digital camera, memory card, or the like.

2. Description of the Related Art

Conventionally, an image file stored in a memory card or the like is defined as a print designated file complying with a standard called DPOF (Digital Print Order Format) in direct printing for printing by connecting a printer to a digital camera, memory card, or the like. It is a common practice that the user designates a plurality of desired images by a DPOF file, and the printer prints the images.

There is available a technique for, when printing is interrupted upon powering off the printer, taking an appropriate measure upon restarting it in the direct print system (for example, see Japanese Patent Laid-Open No. 2003-191577).

However, the user often designates the number of images to be printed, by a DPOF file without considering the number of printable sheets based on the remaining amounts of battery, recording sheets, ink, and the like. In some cases, not all print designated images can be printed. This may fail to print images desired by the user.

SUMMARY OF THE INVENTION

The present invention has been made in consideration of the above problem, and to attain a technique for issuing a warning, indicating that the number of print designated sheets exceeds the number of printable sheets, before the start of printing.

According to the present invention, there is provided a print apparatus which prints image data on a recording sheet, comprising: a first calculation unit adapted to calculate the number of printable sheets from a battery remaining amount of the print apparatus; a second calculation unit adapted to calculate the number of printable sheets from a recording sheet remaining amount or ink remaining amount; a determination unit adapted to determine the number of sheets printable by the print apparatus based on the number of printable sheets calculated by the first calculation unit and the number of printable sheets calculated by the second calculation unit; and a display unit adapted to display the number of printable sheets determined by the determination unit.

There is also provided a print apparatus which prints image data on a recording sheet, comprising: a first calculation unit adapted to calculate the number of printable sheets from a battery remaining amount of the print apparatus; a second calculation unit adapted to calculate the number of printable sheets from a recording sheet remaining amount or ink remaining amount; a determination unit adapted to determine the number of sheets printable by the print apparatus based on the number of printable sheets calculated by the first calculation unit and the number of printable sheets calculated by the second calculation unit; and a display unit adapted to display the number of printable sheets determined by the determination unit, wherein before the start of a print operation, the determination unit determines, as the number of sheets printable by the print apparatus, the number of printable sheets calculated by the first calculation unit, and, after the start of the print operation, the second calculation unit calculates the number of printable sheets to cause the determination unit to determine the number of sheets printable by the print apparatus again based on the number of printable sheets calculated by the first calculation unit and the number of printable sheets calculated by the second calculation unit.

There is also provided a control method of a print apparatus which prints image data on a recording sheet, comprising: a first calculation step of calculating the number of printable sheets from a battery remaining amount of the print apparatus; a second calculation step of calculating the number of printable sheets from a recording sheet remaining amount or ink remaining amount; a determination step of determining the number of sheets printable by the print apparatus based on the number of printable sheets calculated in the first calculation step and the number of printable sheets calculated in the second calculation step; and a display step of displaying, on a display, the number of printable sheets determined in the determination step.

There is also provided a print system in which a digital camera directly communicates with a print apparatus and the print apparatus prints image data stored in the digital camera, the print apparatus comprising: a first calculation unit adapted to calculate the number of printable sheets from a battery remaining amount of the print apparatus; a second calculation unit adapted to calculate the number of printable sheets from a recording sheet remaining amount or ink remaining amount; and a determination unit adapted to determine the number of sheets printable by the print apparatus based on the number of printable sheets calculated by the first calculation unit and the number of printable sheets calculated by the second calculation unit, and the digital camera comprising a display unit adapted to display the number of printable sheets determined by the determination unit.

There is also provided a print system in which an image sensing apparatus directly communicates with a print apparatus and the print apparatus prints image data stored in the image sensing apparatus, the image sensing apparatus comprising a designation unit adapted to designate image data to be printed by the print apparatus, and the print apparatus comprising: a determination unit adapted to determine the number of image data printable by the print apparatus; a comparison unit adapted to compare the number of print designated sheets designated by the designation unit with the number of printable sheets determined by the determination unit; and a display unit adapted to display, when the number of print designated sheets exceeds the number of printable sheets, a warning message, indicating that not all the images designated by the designation unit can be printed, before the start of printing by the print apparatus.

There is also provided a print apparatus which receives image data stored in an image sensing apparatus or recording medium and prints the image data, comprising: a designation unit adapted to designate image data to be printed from the image data stored in the image sensing apparatus or recording medium; a determination unit adapted to determine the number of image data printable by the print apparatus; a comparison unit adapted to compare the number of print designated sheets designated by the designation unit with the number of printable sheets determined by the determination unit; and a display unit adapted to display, when the number of print designated sheets exceeds the number of printable sheets, a warning message, indicating that not all the images designated by the designation unit can be printed, before the start of printing by the print apparatus.

There is also provided an image sensing apparatus which can directly communicate with a print apparatus which prints image data, comprising: a designation unit adapted to designate image data to be printed from image data stored in the image sensing apparatus; a transfer unit adapted to transfer the image data designated by the designation unit to the print apparatus; an acquisition unit adapted to acquire the number of printable image data from the print apparatus; a comparison unit adapted to compare the number of print designated sheets designated by the designation unit with the number of printable sheets acquired by the acquisition unit; and a display unit adapted to display, when the number of print designated sheets exceeds the number of printable sheets, a warning message, indicating that not all the images designated by the designation unit can be printed, before the start of printing by the print apparatus.

There is also provided a control method of a print system in which an image sensing apparatus directly communicates with a print apparatus and the print apparatus prints image data stored in the image sensing apparatus, comprising: a designation step of causing the image sensing apparatus to designate image data to be printed by the print apparatus; a determination step of causing the print apparatus to determine the number of image data printable by the print apparatus; a comparison step of causing the print apparatus to compare the designated number of print designated sheets with the determined number of printable sheets; and a display step of causing the print apparatus to display, when the number of print designated sheets exceeds the number of printable sheets, a warning message, indicating that not all the designated images can be printed, before the start of printing by the print apparatus.

There is also provided a control method of a print apparatus which receives image data stored in an image sensing apparatus or recording medium and prints the image data, comprising: a designation step of designating image data to be printed from the image data stored in the image sensing apparatus or recording medium; a determination step of determining the number of image data printable by the print apparatus; a comparison step of comparing the designated number of print designated sheets with the determined number of printable sheets; and a display step of displaying, when the number of print designated sheets exceeds the number of printable sheets, a warning message, indicating that not all the designated images can be printed, before the start of printing by the print apparatus.

There is also provided a control method of an image sensing apparatus which can directly communicate with a print apparatus which prints image data, comprising: a designation step of designating image data to be printed from image data stored in the image sensing apparatus; a transfer step of transferring the image data designated in the designation step to the print apparatus; an acquisition step of acquiring the number of printable image data from the print apparatus; a comparison step of comparing the designated number of print designated sheets with the acquired number of printable sheets; and a display step of displaying, when the number of print designated sheets exceeds the number of printable sheets, a warning message, indicating that not all the designated images can be printed, before the start of printing by the print apparatus.

According to the present invention, it is possible to notify the user before the start of printing that not all the designated images can be printed, by issuing a warning, indicating that the number of print designated sheets exceeds the number of printable sheets, before the start of printing. It is therefore possible to, e.g., re-set the number of print designated sheets to avoid interruption of the print operation upon power OFF or when recording sheets or ink has run short, resulting in an improvement in user-friendliness.

Further features of the present invention will become apparent from the following description of exemplary embodiments with reference to the attached drawings.

BRIEF DESCRIPTION OF THE DRAWINGS

FIG. 4 is a view illustrating a printer UI screen for warning display in direct printing according to the first embodiment;

FIG. 5 is a view illustrating another printer UI screen for warning display in direct printing according to the first embodiment;

FIG. 7 is a view illustrating still another printer UI screen for warning display in direct printing according to the first embodiment;

FIG. 8 is a view illustrating still another printer UI screen for warning display in direct printing according to the first embodiment;

FIG. 9 is a view illustrating still another printer UI screen for warning display in direct printing according to the first embodiment;

DESCRIPTION OF THE EMBODIMENTS

Best modes for carrying out the present invention will be described in detail below with reference to the accompanying drawings.

Note that the embodiments to be described hereinafter are merely practical examples of the present invention and can be appropriately modified or changed in accordance with various conditions and the arrangement of an apparatus to which the present invention is applied. The present invention is not limited to the following embodiments.

Figure 1:
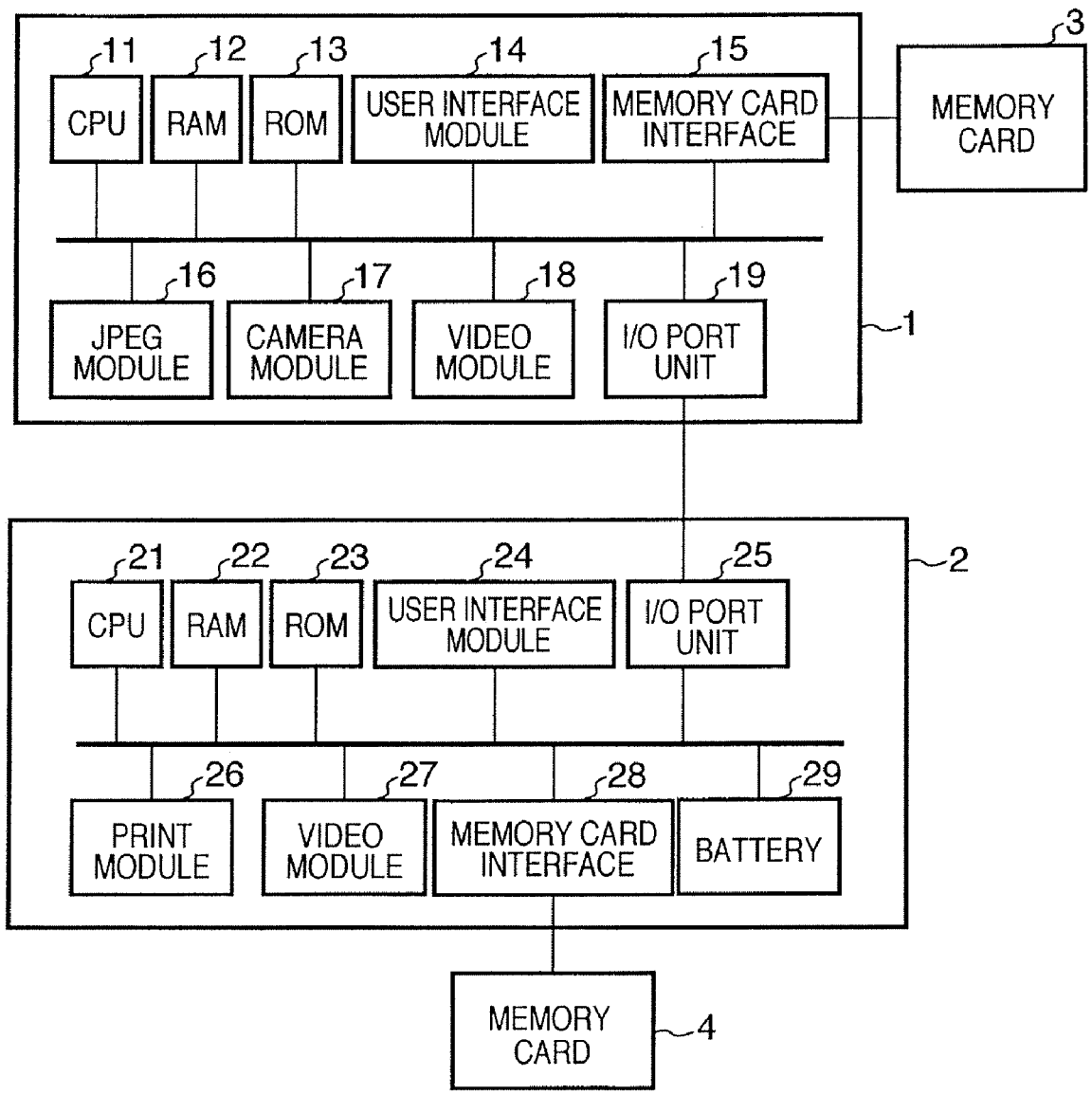
FIG. 1 is a block diagram showing the configuration of a direct print system according to an embodiment of the present invention.

FIG. 1 is a block diagram showing the configuration of a direct print system according to an embodiment of the present invention.

Referring to FIG. 1, reference numeral 1 denotes a digital camera compatible to direct printing; 2, a printer compatible to direct printing; 3, a memory card mounted in the digital camera; and 4, a memory card mounted in the printer.

The digital camera 1 and printer 2 are connected by wire or radio via a communication device. An image to be printed is transmitted as data in a JPEG format from the digital camera 1 to the printer 2 or from the memory card 4 to the printer 2.

The digital camera 1 comprises a CPU 11 which controls the overall camera and executes various arithmetic data processes, a RAM 12 which stores the various data arithmetically processed by the CPU 11, and a ROM 13 which prestores various data and programs to be executed by the CPU 11.

The digital camera 1 also comprises a user interface module 14 which reads the state of a button to be operated by the user, a memory card interface 15 which connects to the external memory card 3, and a JPEG module 16 which JPEG-compresses/expands image data.

The digital camera 1 also comprises a camera module 17 which causes an image sensing element to capture an image via a lens or shutter, and a video module 18 which causes a display unit such as an LCD mounted on the camera to display an image, UI (user interface) screen (to be described later), and the like.

The digital camera 1 also comprises an I/O port unit 19 which connects to external devices such as a printer and personal computer (PC) and transmits/receives data to/from them.

The printer 2 comprises a CPU 21 which controls the overall printer and executes various arithmetic data processes, a RAM 22 which stores the various data arithmetically processed by the CPU 21, and a ROM 23 which prestores various data and programs to be executed by the CPU 21.

The printer 2 also comprises a user interface module 24 which reads the state of a button to be operated by the user, and an I/O port unit 25 which connects to the digital camera 1, PC, and the like and transmits/receives data to/from them.

The printer 2 also comprises a print module 26 including a paper feed/discharge motor and a printhead which prints image data transmitted from the digital camera 1.

The printer 2 also comprises a video module 27 which causes a display unit such as an LCD mounted on the printer 2 to display an image, UI (user interface) screen (to be described later), and the like, a memory card interface 28 which connects to the external memory card 4, and a battery 29.

Figure 17:
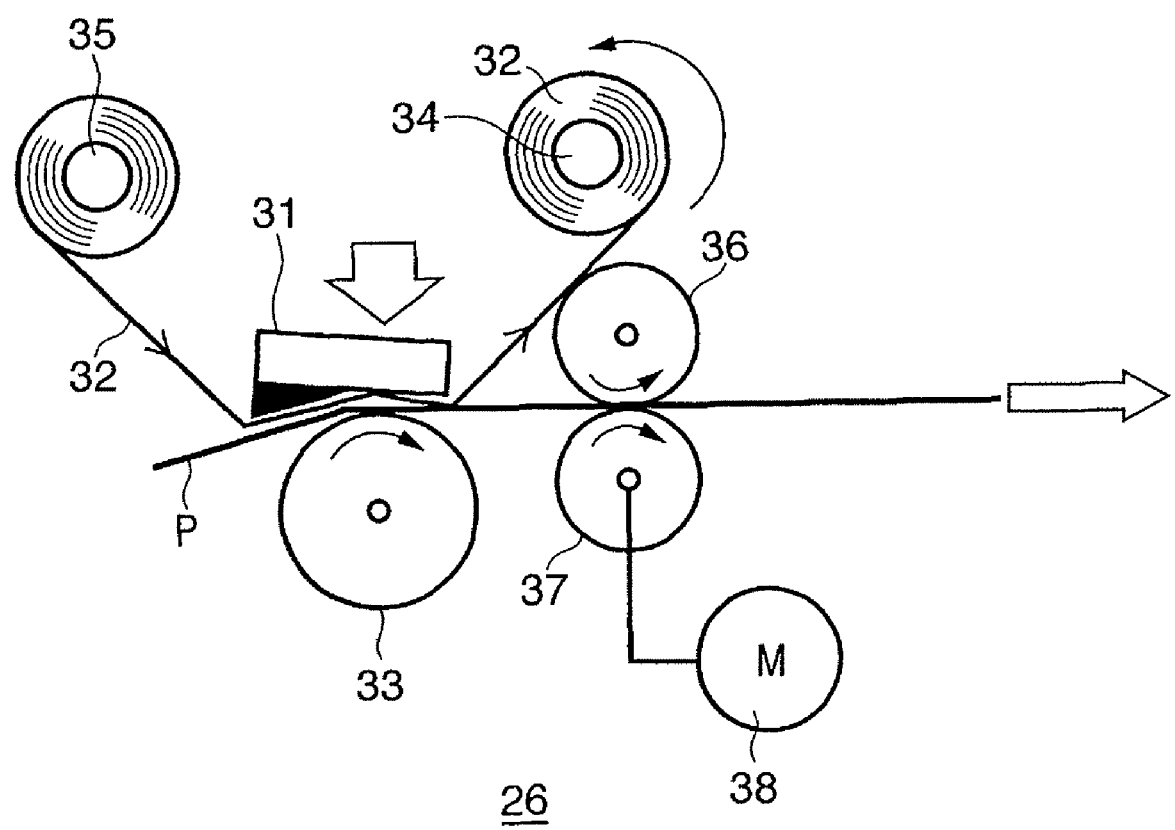
FIG. 17 is a view showing the structure of a print module in a direct print system according to an embodiment of the present invention.

The print module 26 will be explained in detail next with reference to FIG. 17.

Reference numeral 31 denotes a thermal head which transfers ink applied on an ink sheet 32 onto a recording sheet (a printing paper) P to print an image. The sheet P is conveyed by rotation of a capstan roller 37 arranged downstream in the recording direction (the sub-scanning direction of the thermal head 31, i.e., the direction indicated by the arrow in FIG. 17) and by a pinch roller 36 which is in press contact with the capstan roller 37 to be rotatable while following the capstan roller 37. The capstan roller 37 and pinch roller 36 form a sheet convey mechanism which conveys the sheet P.

The both end portions of the ink sheet 32 are bonded to a supply bobbin 35 and winding bobbin 34. Upon receiving the driving force from the printer, the winding bobbin 34 winds up the ink sheet 32 from the supply bobbin 35 through the heat generating surface of the thermal head 31. During printing, the ink sheet 32 and sheet P are superposed on each other and conveyed while being in press contact between a platen roller 33 and the heat generating surface of the thermal head 31. As the ink sheet 32 and sheet P are conveyed, the heat generating portion of the thermal head 31 opposing the ink sheet 32 is driven (energized) to thermally transfer the ink on the ink sheet 32 onto the sheet P. The heat generating portion of the thermal head 31 is formed from a ceramic substrate on which a plurality of heat generating elements are arrayed. The printer prints a desired image (containing characters and symbols) by selectively driving these heat generating elements based on image information. The sheet P is conveyed by causing a convey motor 38 to rotationally drive the capstan roller 37. The pinch roller 36 which is in press contact with the rotating capstan roller 37 produces a sheet convey force. The material of the sheet P serving as a recording target material can be various kinds of materials such as a paper sheet, photographic printing paper sheet, plastic sheet, OHP sheet, envelope, or cloth as long as the sheet P can record an image.

On the ink sheet 32 for color recording, overcoat layers and heat-sensitive color forming layers for colors such as yellow, magenta, and cyan are formed. A color image is formed by sequentially depositing and thermally transferring these layers. When the development of the first color, e.g., yellow is complete, the thermal head 31 separates from the platen roller 33 to develop the next color. In this state, the capstan roller 37 rotates in a direction reverse to that in color development to return the sheet to the color development start position. With the same operation, colors subsequent to the first color are developed.

Although the print module 26 is of a thermal transfer type in this embodiment, another type may be adopted.

First Embodiment

A warning display process in direct printing by a printer according to the first embodiment will be explained below.

Figure 2:
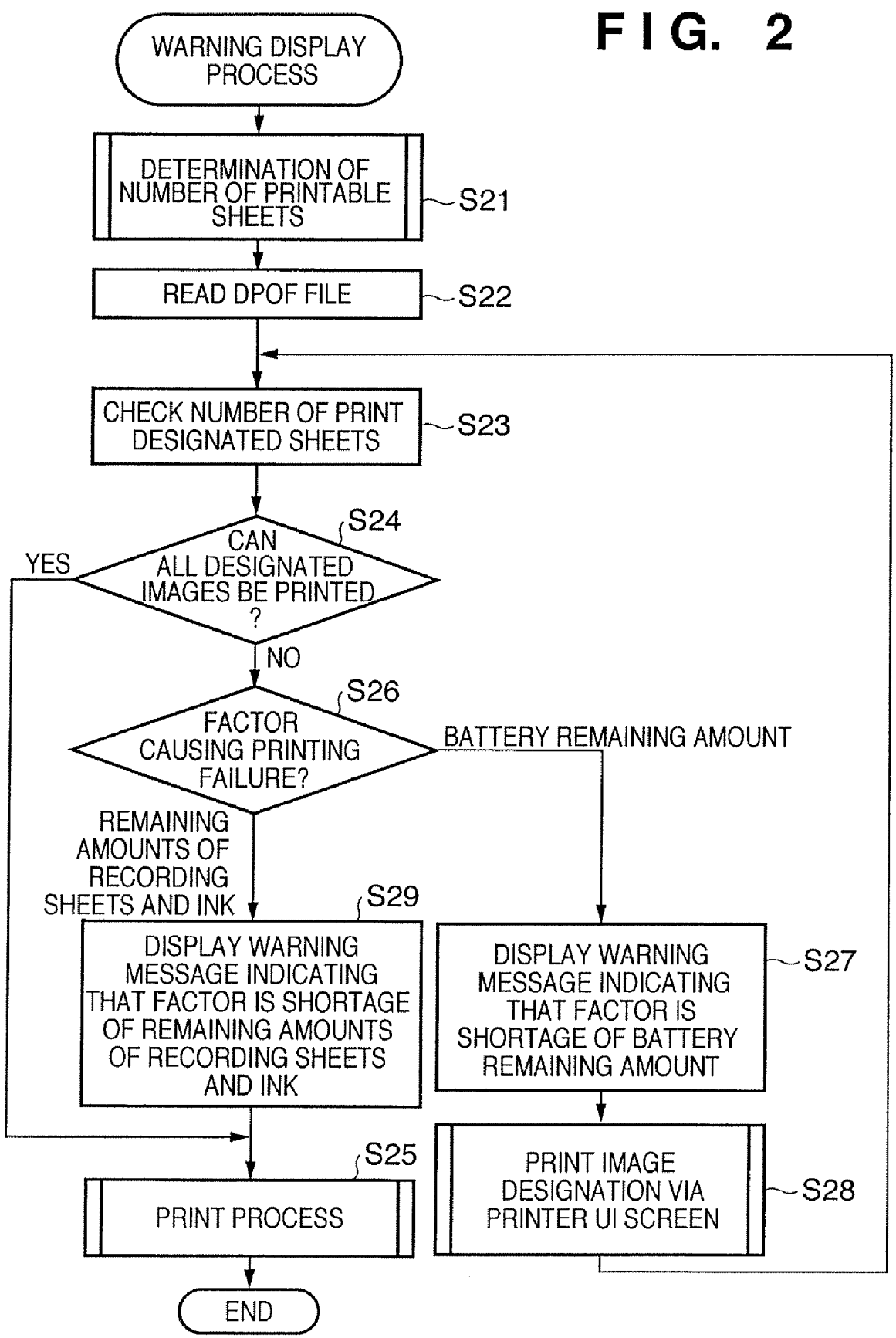
FIG. 2 is a flowchart showing a warning display process according to the first embodiment.

FIG. 2 is a flowchart showing a warning display process in direct printing according to the first embodiment.

Referring to FIG. 2, a printer 2 determines the number of printable sheets (to be described later with reference to FIG. 3) in step S21.

In step S22, the printer 2 reads a DPOF file from a digital camera 1 and/or memory card 4.

In step S23, the printer 2 analyzes the DPOF file read in step S22 to calculate the number of print designated sheets.

In step S24, the printer 2 compares the number of printable sheets calculated in step S21 with the number of print designated sheets calculated in step S23 to check whether all the designated images can be printed. If all the designated images can be printed (YES in step S24), the printer 2 prints the DPOF file in step S25.

If not all the images can be printed (NO in step S24), the printer 2 checks in step S26 whether the factor causing printing failure is the shortage of the battery remaining amount or the shortage of the remaining amounts of recording sheets and ink. If the factor is found to be the shortage of the battery remaining amount in step S26, the printer 2 displays a warning message, indicating that the factor is the shortage of the battery remaining amount, in step S27 (FIG. 4). If the factor is found to be the shortage of the remaining amounts of recording sheets and/or ink in step S26, the printer 2 displays a warning message, indicating that the factor is the shortage of the remaining amounts of recording sheets and ink, in step S29 (FIG. 5).

In either warning display, the printer 2 can start printing in accordance with user's selection.

In direct printing using the memory card 4 and printer 2, the printer displays the list of images designated by a DPOF file to allow the user to designate images on the printer UI screen (S28). The processes from step S23 are executed.

<Process for Determining Number of Printable Sheets>

Figure 3:
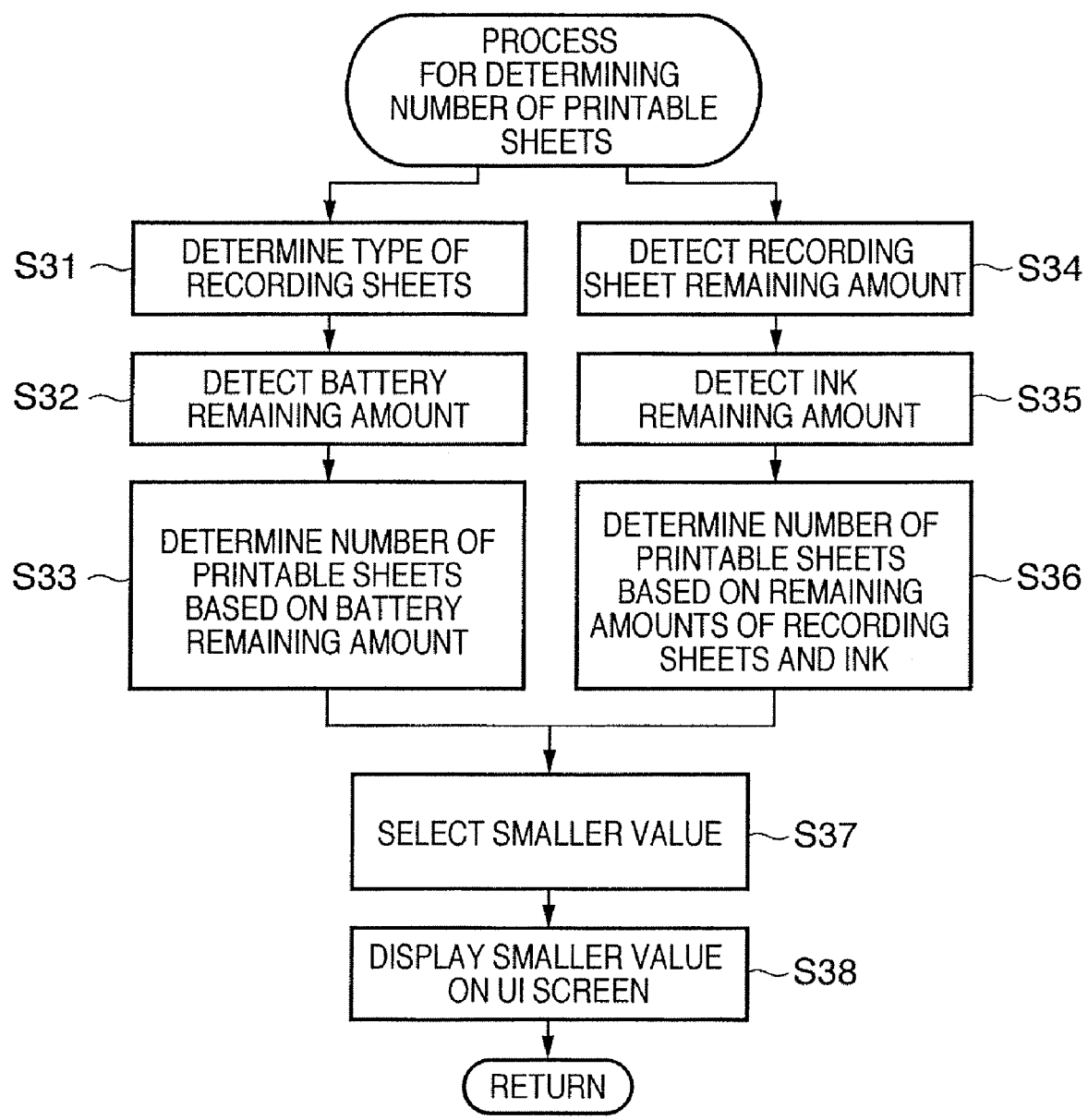
FIG. 3 is a flowchart showing a process for determining the number of printable sheets in step S21 of FIG. 2.

FIG. 3 is a flowchart showing a process for determining the number of printable sheets in step S21 of FIG. 2.

Referring to FIG. 3, the printer 2 checks in step S31 the type of recording sheets accommodated in the printer 2, and detects the battery remaining amount in step S32. In step S33, based on the results obtained in steps S31 and S32, the printer 2 determines the number of printable sheets based on the battery remaining amount and holds the resultant number of printable sheets in the RAM 22.

The printer 2 detects the recording sheet remaining amount in step S34 and the ink remaining amount in step S35. Based on these values, the printer 2 determines the number of printable sheets based on the remaining amounts of recording sheets and ink and holds the resultant number of printable sheets in the RAM 22 (S36).

In steps S37 and S38, the printer 2 compares the number of printable sheets based on the battery remaining amount and the number of printable sheets based on the remaining amounts of recording sheets and ink, and displays the smaller value as the number of sheets printable by the printer 2 on the UI screen.

<Warning Display Screen>

FIGS. 4 to 9 are views illustrating UI screens for warning display in direct printing according to the first embodiment.

FIG. 4 shows a printer UT screen which displays a warning message, indicating that not all the designated images can be printed due to the shortage of the battery remaining amount, in step S27 of FIG. 2. Via this UI screen, the user can understand that not all the designated images can be printed due to the shortage of the battery remaining amount of the printer, and select the start or cancel of printing. If the user selects cancel, he/she can redo image designation. The printer also displays the number of print designated sheets designated by the user, and the number of printable sheets determined from the battery remaining amount, on the printer UI screen. This allows the user to easily understand the number of images printable from now by the printer.

FIG. 5 shows a printer UI screen in direct printing using the digital camera and printer. Referring to FIG. 5, the printer displays a warning message on the printer UT screen, indicating that not all the designated images can be printed due to the shortage of the remaining amounts of recording sheets and/or ink, in step S29 of FIG. 2. The printer also displays a message prompting the user to feed new recording sheets and/or replace the ink cartridge with a new one, on the printer UI screen.

Via this UI screen, the user can understand that not all the designated images can be printed due to the shortage of the remaining amounts of recording sheets and/or ink, and select the start or cancel of printing. If the user selects cancel, he/she can redo image designation. The printer also displays the number of print designated sheets designated by the user, and the number of printable sheets determined from the remaining amounts of recording sheets and/or ink, on the printer UI screen. This allows the user to easily understand the number of images printable from now by the printer.

Figure 6:
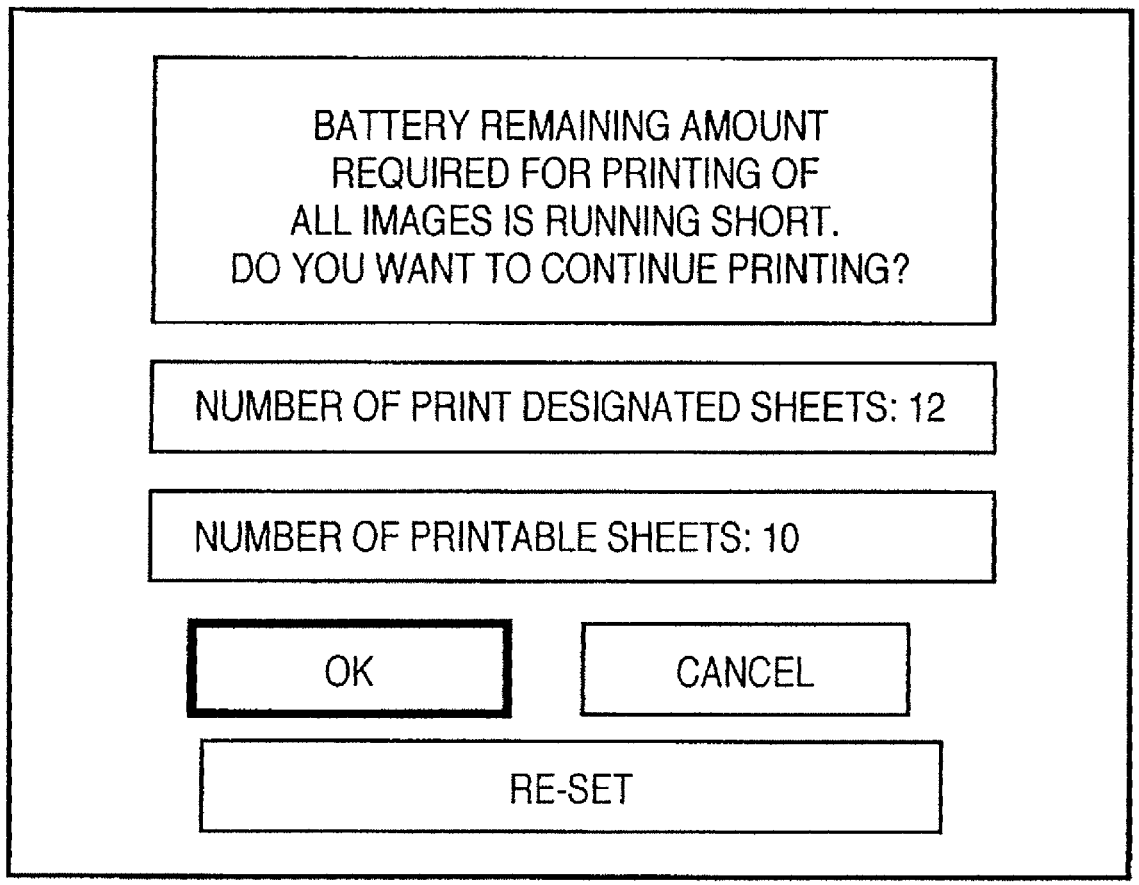
FIG. 6 is a view illustrating still another printer UI screen for warning display in direct printing according to the first embodiment.

FIG. 6 shows a printer UI screen in direct printing using the memory card and printer. Referring to FIG. 6, the printer displays a warning message on the printer UI screen, indicating that not all the designated images can be printed due to the shortage of the battery remaining amount, in step S27 of FIG. 2.

Via this UI screen, the user can understand that not all the designated images can be printed due to the shortage of the battery remaining amount of the printer, and select the start or cancel of printing. If the user selects re-setting, he/she can redo image designation. The printer also displays the number of print designated sheets designated by the user, and the number of printable sheets determined from the battery remaining amount, on the printer UI screen. This allows the user to easily understand the number of images printable from now by the printer.

FIG. 7 shows a printer UI screen in direct printing using the memory card and printer. Referring to FIG. 7, the printer displays a warning message on the printer UI screen, indicating that not all the designated images can be printed due to the shortage of the remaining amounts of recording sheets and/or ink, in step S29 of FIG. 2. The printer also displays a message prompting the user to feed new recording sheets and/or replace the ink cartridge with a new one, on the printer UI screen.

Via this UI screen, the user can understand that not all the designated images can be printed due to the shortage of the remaining amounts of recording sheets and/or ink, and select the start or cancel of printing. If the user selects re-setting, he/she can redo image designation. The printer also displays the number of print designated sheets designated by the user, and the number of printable sheets determined from the remaining amounts of recording sheets and/or ink, on the printer UI screen. This allows the user to easily understand the number of images printable from now by the printer.

If the user redoes image designation via the printer UI screen in step S28 of FIG. 2, he/she decrements the number of images designated by a DPOF file in advance until it becomes equal to or smaller than the number of printable sheets. This makes it possible to print all the images.

FIG. 8 shows a printer UI screen in image designation on the printer side, which displays the number of print designated sheets designated by the user, and the number of printable sheets determined from the battery remaining amount. When the user designates images the number of which exceeds the number of printable sheets determined from the battery remaining amount, the printer displays a warning message indicating that he/she cannot designate images any more due to the shortage of the battery remaining amount to inhibit further image designation, on the printer UI screen. Via this UI screen, the user can understand that he/she cannot designate images any more due to the shortage of the battery remaining amount of the printer, and select the start or cancel of printing of the designated images which remain unprinted.

FIG. 9 shows a printer UI screen in image designation on the printer side, which displays the number of print designated sheets designated by the user, and the number of printable sheets determined from the remaining amounts of recording sheets and/or ink. When the user designates images the number of which exceeds the number of printable sheets determined from the remaining amounts of recording sheets and/or ink, the printer displays a message prompting him/her to feed new recording sheets and/or replace the ink cartridge with a new one, on the printer UI screen. Via this UI screen, the user can understand that the printer may fail in printing even when he/she designates more images due to the shortage of the remaining amounts of recording sheets and/or ink, and select the start or cancel of printing of the designated images which remain unprinted. The user can even select to continue image designation.

The warning message displayed on the UI screen may be output by sound through a loudspeaker.

According to the first embodiment, when the number of print designated sheets of a DPOF file exceeds the number of printable sheets determined from the remaining amount of battery, recording sheets, or ink of the printer, a warning indicating that not all the designated images can be printed is issued before the start of printing. This makes it possible to notify the user before the start of printing that not all the designated images can be printed. It is therefore possible to, e.g., re-set the number of print designated sheets to avoid interruption of the print operation upon power OFF or when recording sheets or ink has run short, resulting in an improvement in user-friendliness.

In the first embodiment, of the number of printable sheets calculated from the battery remaining amount and the number of printable sheets calculated from the remaining amounts of recording sheets and ink, the smaller one is determined as the number of sheets printable by the printer. However, the number of printable sheets may be calculated from each of the remaining amounts of recording sheets and ink, and the smallest number of printable sheets out of three may be determined as the number of sheets printable by the printer.

When, for example, the printer is one which performs printing with a cartridge that accommodates both recording sheets and ink, the remaining amounts of recording sheets and ink are equivalent to each other. A printer of this type does not require detection of the remaining amounts of both recording sheets and ink. The remaining amount of either recording sheets or ink may be detected to calculate the number of printable sheets from the detected remaining amount of recording sheets or ink.

Assume that the printer is one compatible to power supply from both the battery and outlet. In battery driving, the number of printable sheets may be determined and displayed as described above. In power supply from the outlet, the number of sheets printable by the printer may be determined based on the number of printable sheets calculated from the remaining amounts of recording sheets and ink.

Second Embodiment

A warning display process in direct printing by a digital camera according to the second embodiment will be explained below.

Figure 10:
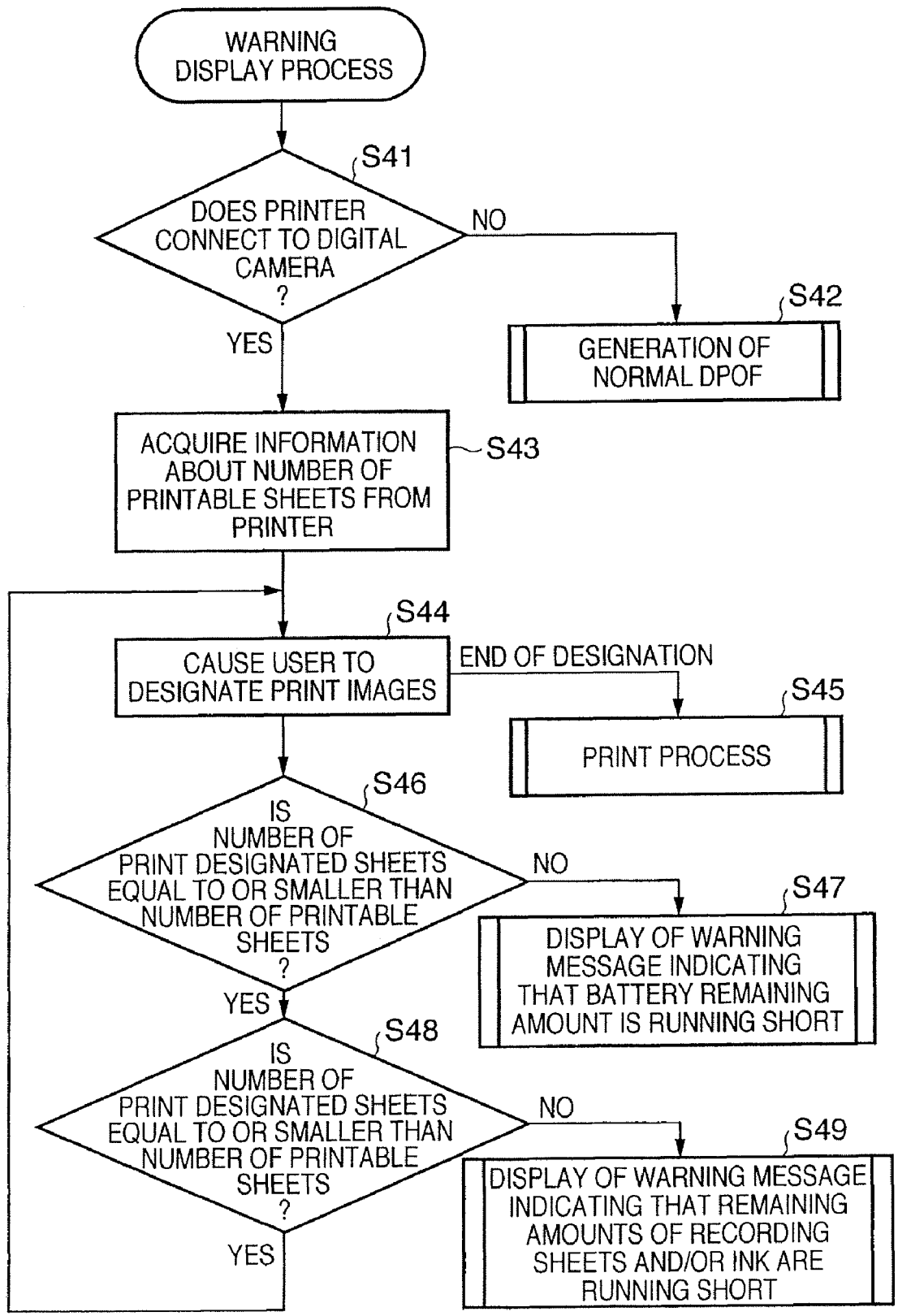
FIG. 10 is a flowchart showing a warning display process in direct printing according to the second embodiment.

FIG. 10 is a flowchart showing a warning display process in direct printing according to the second embodiment.

Referring to FIG. 10, a digital camera 1 checks in step S41 whether a printer 2 connects to the digital camera 1. If the printer 2 does not connect to the digital camera 1, the digital camera 1 generates a normal DPOF file in step S42. If the printer 2 connects to the digital camera 1, the digital camera 1 acquires information about the number of printable sheets, calculated by the procedure shown in FIG. 3, from the printer 2 (S43).

In step S44, in the digital camera 1, the user designates print images. When print image designation is complete, the digital camera 1 transfers the images to the printer 2 to start printing in step S45.

Figure 12:
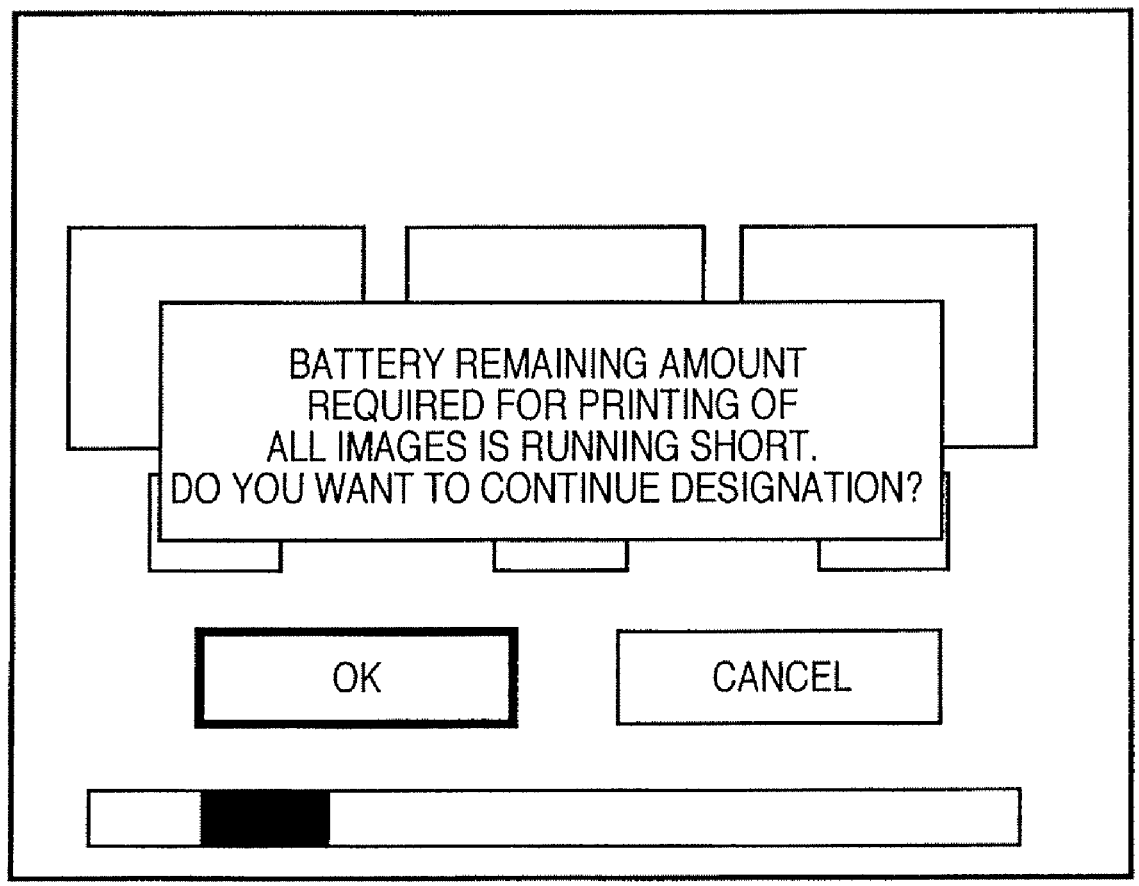
FIG. 12 is a view illustrating a camera UI screen for warning display in direct printing according to the second embodiment.

As the user designates the print images, the digital camera 1 checks whether the number of print designated sheets is equal to or smaller than the number of printable sheets determined based on the battery remaining amount (S46). If the number of print designated sheets exceeds the number of printable sheets (NO in step S46), the digital camera 1 displays a warning message, indicating that the battery remaining amount is running short, in step S47 (FIG. 12).

Figure 15:
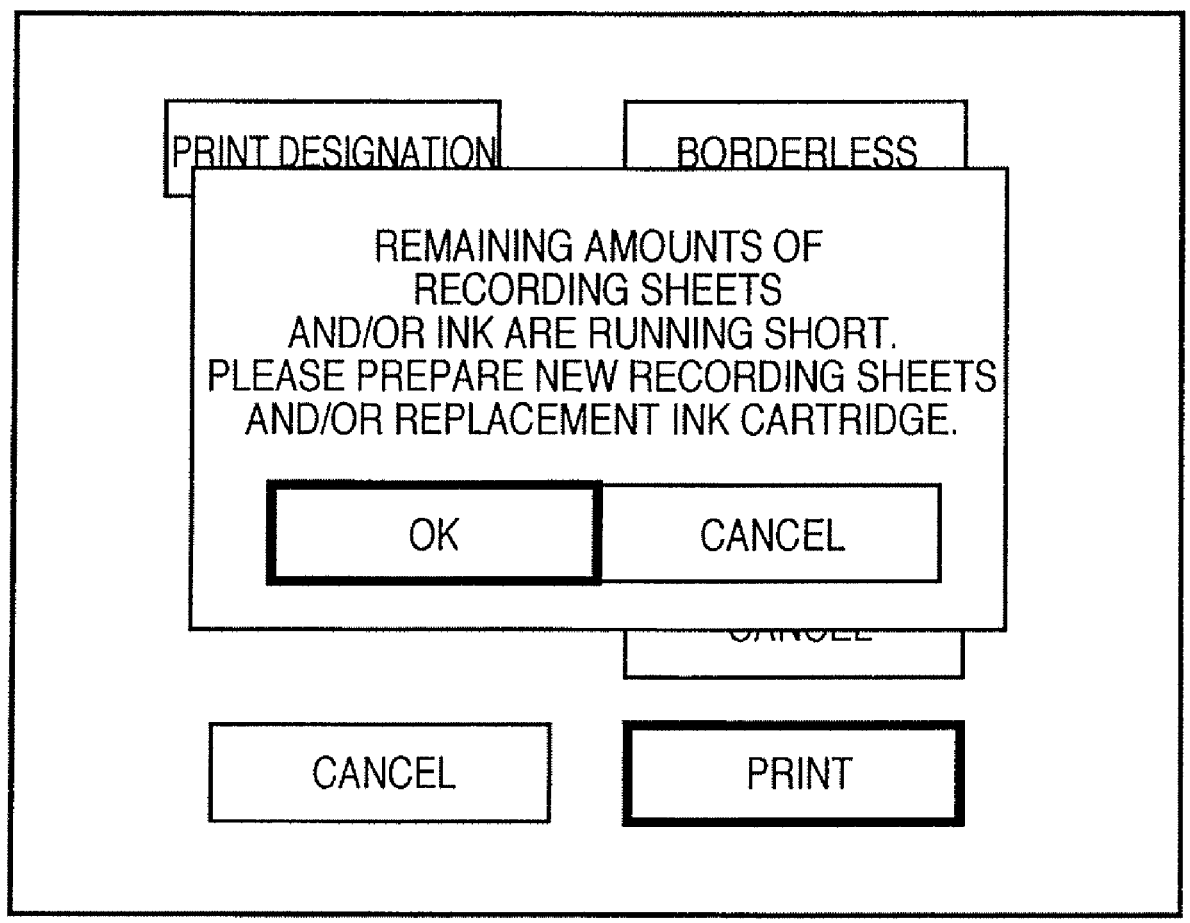
FIG. 15 is a view illustrating still another camera UI screen for warning display in direct printing according to the second embodiment.

If the number of print designated sheets is equal to or smaller than the number of printable sheets (YES in step S46), the digital camera 1 checks whether the number of print designated sheets is equal to or smaller than the number of printable sheets determined based on the remaining amounts of recording sheets and ink (S48). If the number of print designated sheets exceeds the number of printable sheets (NO in step S48), the digital camera 1 displays a warning message, indicating that the remaining amounts of recording sheets and/or ink are running short, in step S49 (FIG. 15).

If the number of print designated sheets is equal to or smaller than the number of printable sheets (YES in step S48), the process returns to step S44 to end print image designation by the user and execute printing (S45).

<Print Image Designation Process>

Figure 11:
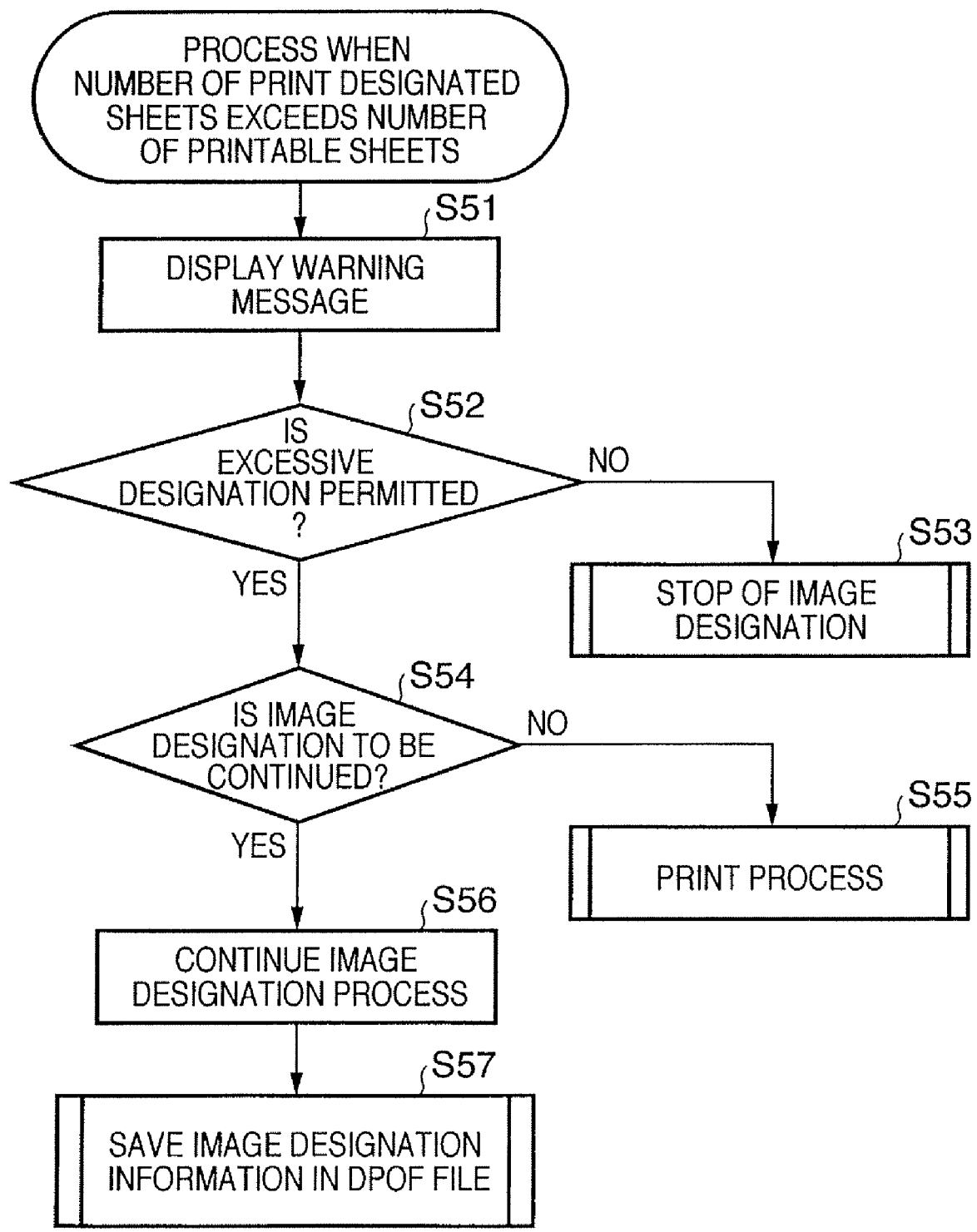
FIG. 11 is a flowchart showing a process when the user designates images, the number of which exceeds the number of printable sheets, in steps S46 to S49 of FIG. 10.

FIG. 11 is a flowchart showing a process when the user designates images, the number of which exceeds the number of printable sheets, in steps S46 to S49 of FIG. 10.

Referring to FIG. 11, when the camera displays a warning message on the camera UI screen in step S51 (steps S47 and S49 of FIG. 10), it is checked in step S52 whether designation of images the number of which exceeds the number of printable sheets is permitted in the system of the digital camera 1. If excessive designation is not permitted (NO in step S52), further image designation is stopped in step S53.

If excessive designation is permitted (YES in step S52), the user selects in step S54 whether to continue print image designation. If the user selects in step S54 not to continue print image designation, printing starts in step S55.

If the user selects in step S54 to continue print image designation, he/she continues image designation in step S56. Since printing is interrupted halfway (as the number of printed sheets reaches the number of printable sheets) at high probability, the print image designation information is stored in a DPOF file (S57).

It is therefore possible to print images until the number of printed sheets reaches the number of printable sheets and allow the user to designate images the number of which exceeds the number of printable sheets.

<Warning Display Screen>

FIGS. 12 to 16 are views illustrating UI screens for warning display in direct printing according to the second embodiment.

FIG. 12 shows a camera UI screen in direct printing using the digital camera and printer. Referring to FIG. 12, the camera displays a warning message on the camera UI screen, indicating that not all the designated images can be printed due to the shortage of the battery remaining amount, in step S47 of FIG. 10. The camera also displays a UI screen for selecting whether to continue image designation in step S54 of FIG. 11. Via this UI screen, the user can understand that not all the designated images can be printed due to the shortage of the battery remaining amount, and select the continuation or cancel of printing.

Figure 13:
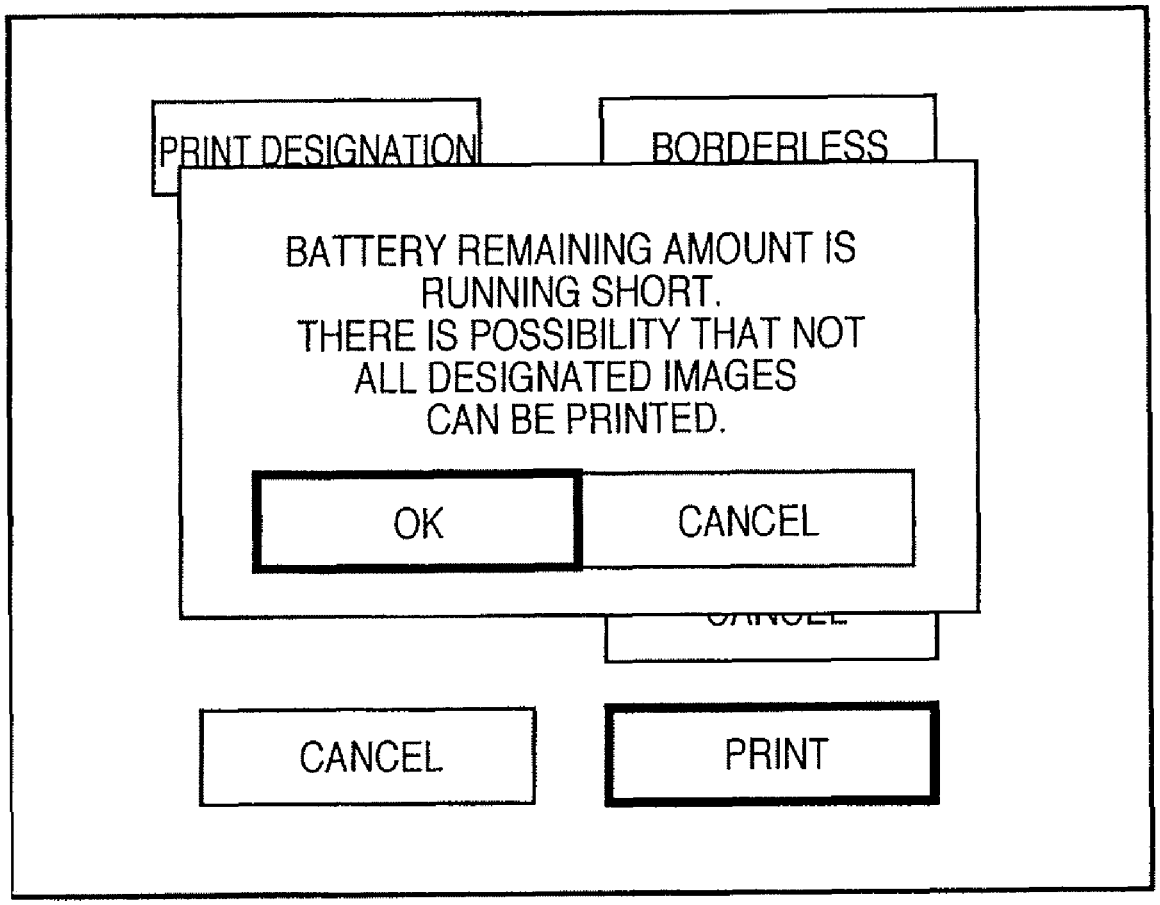
FIG. 13 is a view illustrating another camera UI screen for warning display in direct printing according to the second embodiment.

If the user selects to continue image designation on the camera UI screen shown in FIG. 12 and end image designation in step S54 of FIG. 11 to start a print process, the camera displays a warning message on the camera UI screen, indicating that not all the designated images can be printed due to the shortage of the battery remaining amount, as shown in FIG. 13.

Figure 14:
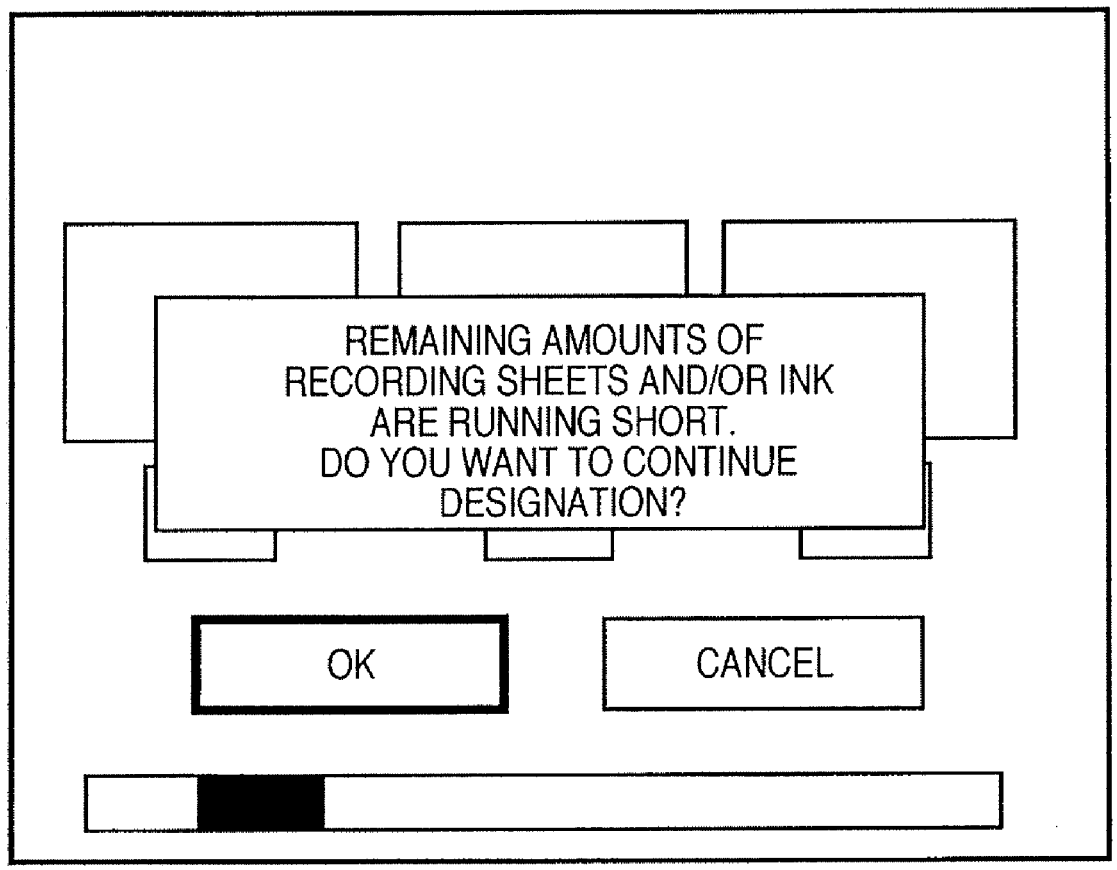
FIG. 14 is a view illustrating still another camera UI screen for warning display in direct printing according to the second embodiment.

FIG. 14 shows a camera UI screen in direct printing using the digital camera and printer. Referring to FIG. 14, the camera displays a warning message on the camera UI screen, indicating that the remaining amounts of recording sheets and/or ink are running short, in step S49 of FIG. 10. The camera also displays a UI screen for selecting whether to continue image designation in step S54 of FIG. 11. Via this UI screen, the user can understand that not all the designated images can be printed due to the shortage of the remaining amounts of recording sheets and/or ink, and select the continuation or cancel of printing.

Even if the user selects to continue image designation on the camera UI screen shown in FIG. 14, printing is possible as long as new recording sheets and/or ink cartridge are available when the remaining amounts of recording sheets and/or ink have run short. For this purpose, as the user selects to continue image designation in FIG. 14, the camera displays a message prompting him/her to prepare new recording sheets and/or ink cartridge on the camera UT screen, as shown in FIG. 15.

Figure 16:
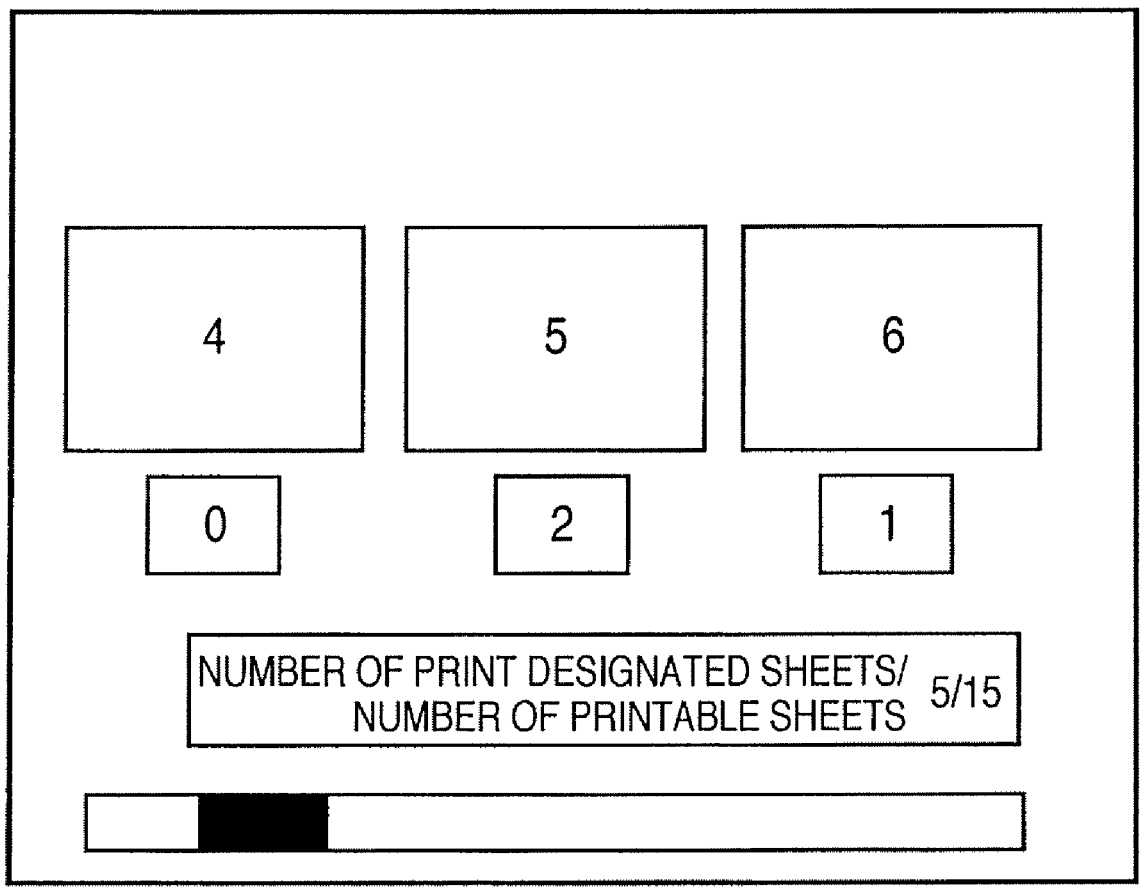
FIG. 16 is a view illustrating still another camera UI screen for warning display in direct printing according to the second embodiment.

FIG. 16 is a camera UI screen in direct printing using the digital camera and printer. Referring to FIG. 16, the camera displays the current number of print designated sheets in parallel with the number of printable sheets acquired from the printer on the camera UI screen in step S43 of FIG. 10. Displaying the number of printable sheets and the current number of print designated sheets as shown in FIG. 16 allows the user to continue image designation in consideration of the number of printable sheets.

The warning message displayed on the camera UI screen may be output by sound through a loudspeaker.

According to the second embodiment, like the first embodiment, it is possible to notify the user before the start of printing that not all the designated images can be printed.

Third Embodiment

A warning display process in direct printing by a printer according to the third embodiment will be explained below. The printer according to the third embodiment has the same arrangement as that of the above-described printer. The same step numbers as in the first and second embodiments denote the same processes in the third embodiment, and a repetitive description thereof will be omitted.

Like the first embodiment, the printer according to the third embodiment calculates the number of printable sheets from each of the remaining amounts of battery and ink, and displays the smaller one as the number of sheets printable by the printer. The battery remaining amount can be detected before the start of printing, while the ink remaining amount cannot sometimes be detected until printing starts, depending on the remaining amount detection method. In the third embodiment, a method of determining the number of sheets printable by the printer in this situation will be explained. A warning display process unrelated to determination of the number of printable sheets or a process when the number of print designated sheets exceeds the number of printable sheets are the same as those in the first and second embodiments, and a repetitive description thereof will be omitted. An ink remaining amount detection method according to the third embodiment will be explained first with reference to FIG. 18.

Figure 18:
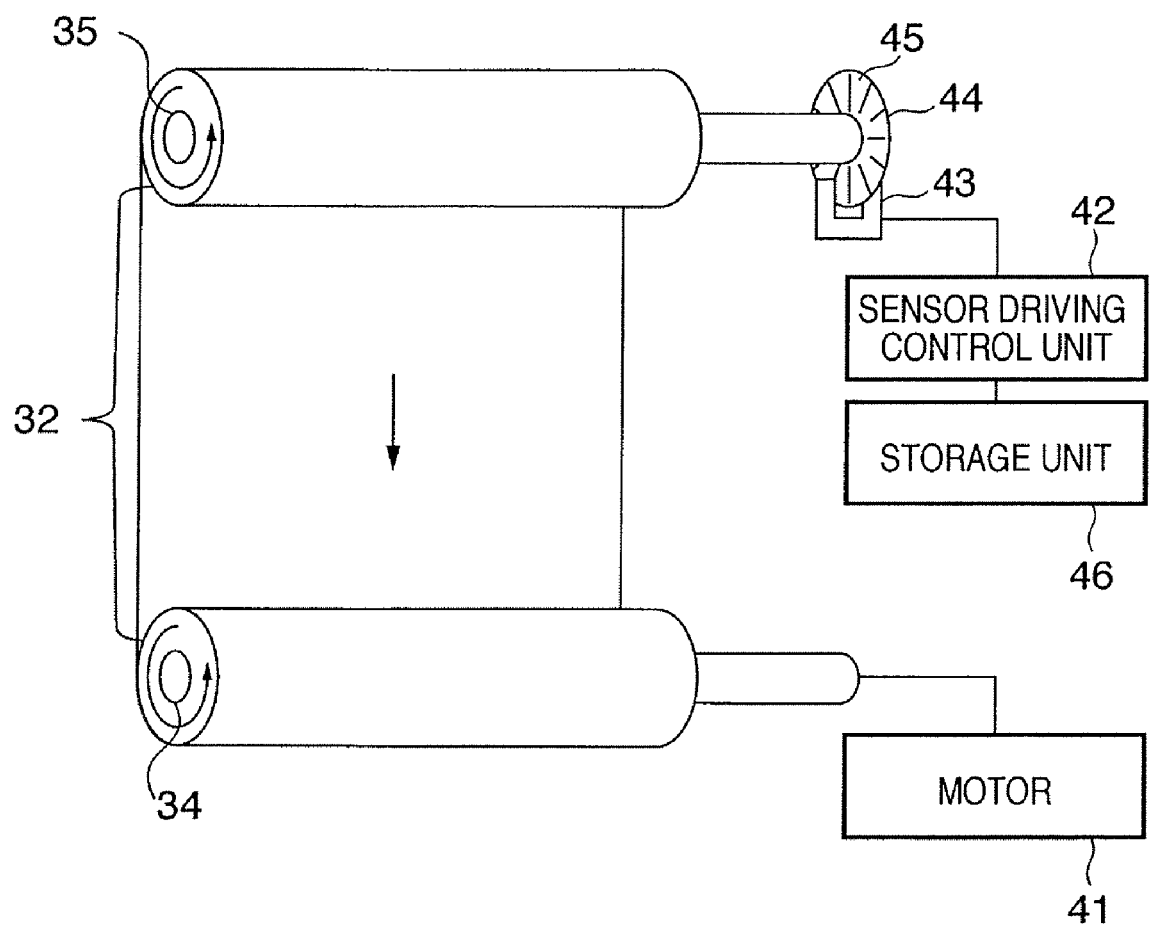
FIG. 18 is a diagram showing an ink remaining amount detection mechanism in direct printing according to the third embodiment.

In the third embodiment, the ink remaining amount is detected by detecting the winding speed of an ink sheet 32. FIG. 18 is a diagram for explaining an ink remaining amount detection method in this case. The same reference numerals as in the above-described embodiments denote the same constituent components in FIG. 18.

In a print operation, as a winding bobbin 34 rotates upon receiving power from a motor 41, a supply bobbin 35 also rotates. The ink sheet 32 is conveyed relative to a thermal head 31 at a constant speed while being wound around the winding bobbin 34 from the supply bobbin 35. The supply bobbin 35 rotates at a low speed when the ink remaining amount is large and the ink bobbin on the supply bobbin 35 side has a large diameter. The supply bobbin 35 rotates at a high speed when the ink remaining amount is small and the ink bobbin on the supply bobbin 35 side has a small diameter. Detecting the rotation speed of the supply bobbin 35 makes it possible to detect the ink remaining amount. As a rotation speed detection mechanism for the supply bobbin 35, a rotary plate 44 having radial slits 45 and an ink remaining amount detection sensor 43 for reading the slit 45 is provided at the end portion of the supply bobbin 35. The ink remaining amount detection sensor 43 is a light-transmitting sensor. As the motor 41 rotates the winding bobbin 34, the ink sheet 32 is wound up in the direction indicated by the arrow in FIG. 18. As the ink sheet 32 is conveyed, the supply bobbin 35 also rotates to rotate the rotary plate 44 through the supply bobbin 35. As the rotary plate 44 rotates, the slit 45 shields light which enters from the light-emitting element of the ink remaining amount detection sensor 43. The light-receiving element of the ink remaining amount detection sensor 43 detects the incident light as a pulse. A timer of a sensor driving control unit 42 measures the period of this pulse. A storage unit 46 prestores data which is obtained by measuring the relationship between the ink remaining amount and the pulse period, and used as an ink remaining amount detection criterion. In this manner, the rotation speed of the ink sheet is detected to calculate the ink remaining amount in accordance with the correspondence relationship between the detected rotation speed and the ink remaining amount. Although the sensor driving control unit 42 is an independent control unit, the CPU of the printer may execute the process of the sensor driving control unit 42.

Figure 19:
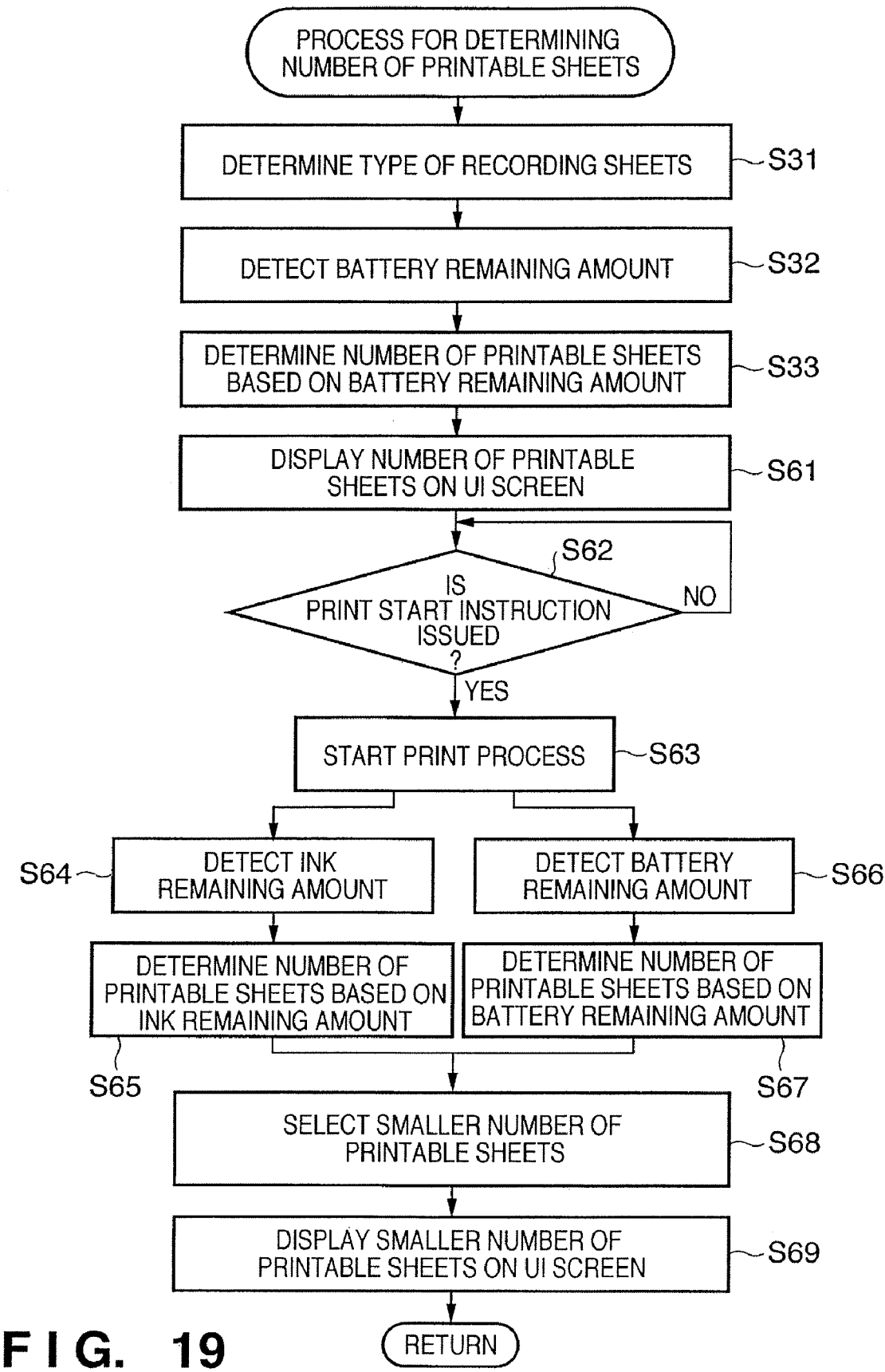
FIG. 19 is a flowchart showing a process for determining the number of printable sheets according to the third embodiment.

A process for determining the number of printable sheets according to the third embodiment will be explained next with reference to the flowchart shown in FIG. 19.

Before the start of a print operation, the type of recording sheet is checked (S31), the battery remaining amount is detected (S32), and the number of printable sheets is calculated from the battery remaining amount (S33). These processes are the same as those in the first embodiment. Subsequently, also before the start of the print operation, the number of printable sheets calculated from the battery remaining amount is determined as the number of sheets printable by the printer. The printer displays the number of printable sheets on the printer UI screen (S61).

Since the ink remaining amount cannot be detected until the printing operation starts, the number of printable sheets cannot be calculated from the ink remaining amount. However, the battery remaining amount is ready to be detected at any timing. Hence, the number of sheets printable by the printer is determined using only the number of printable sheets calculated from the battery remaining amount.

When the user inputs a print start instruction via a user interface module 24 or I/O port unit 25 (S62), the printer starts a print operation such as conveyance of an ink sheet and recording sheet and printing of a print designated image (S63). As the conveyance of an ink sheet starts, it becomes possible to detect the ink remaining amount based on the rotation speed of the ink sheet. The ink remaining amount is therefore detected (S64). The number of printable sheets is calculated from the detected ink remaining amount (S65). The processes in steps S32 and S33 are redone in parallel with the processes in steps S64 and S65. Since the battery remaining amount may naturally change upon the print operation, the battery remaining amount is detected (S66). The number of printable sheets is calculated from the battery remaining amount (S67).

In step S68, the number of printable sheets calculated from the ink remaining amount is compared with the number of printable sheets calculated from the battery remaining amount, and the smaller one is selected as the number of sheets printable by the printer (S68). The printer displays the number of printable sheets on the printer UI screen (S69). When the number of printable sheets displayed at this time has changed from that displayed in step S61, it is good to display a warning message for notifying the user of it.

With these processes, before the start of the print operation, the user can be notified of the number of printable sheets based on the battery remaining amount, and, after the print operation, the number of sheets printable by the printer can be determined in consideration of the number of printable sheets based on the ink remaining amount and sent to the user.

Although the battery remaining amount is detected twice, i.e., before and after the start of the print operation in the third embodiment, the number of printable sheets calculated before the start of the print operation may be used without detecting the battery remaining amount after the start of the print operation. If the result of comparison between the number of printable sheets based on the ink remaining amount and the number of printable sheets based on the battery remaining amount reveals in step S68 that the number of printable sheets based on the battery remaining amount is smaller, change in number of printable sheets is unnecessary and the process in step S69 is omitted.

Also in the third embodiment, during the conveyance of an ink sheet, the remaining amounts of ink and battery are detected in parallel. However, the battery remaining amount may rapidly decrease depending on the print condition or environment. The battery remaining amount may be detected after completing preheating of the thermal head or completing printing of one sheet.

Also in the third embodiment, the number of printable sheets may change after the start of the print operation. The changed number of printable sheets may be compared with the number of print designated sheets to display a warning message, indicating that not all the print designated images can be printed, like the first or second embodiment.

Other Embodiment

The present invention is also achieved by supplying a computer program which implements the functions of the above-described embodiments to the system or apparatus directly or from a remote site. In this case, the computer of the system or the like reads out and executes the computer program.

Hence, the computer program itself which is installed in a computer to implement the functional processing of the present invention also implements the present invention.

In this case, the program can take any form such as an object code, a program to be executed by an interpreter, or script data to be supplied to the OS as long as the functions of the program are available.

Examples of a recording medium (storage medium) to supply the program are a flexible disk, hard disk, optical disk, magnetooptical disk, MO, CD-ROM, CD-R, CD-RW, magnetic tape, nonvolatile memory card, ROM and DVD (DVD-ROM or DVD-R).

The following program supply method is also available. A client computer may connect to a homepage on the Internet via a browser to download the computer program itself of the present invention from the homepage. The program can be supplied even by downloading a compressed file containing an automatic installation function to a recording medium such as a hard disk. The computer programs which constitute the program of the present invention may be divided into a plurality of files so that the user can download the files from different homepages. That is, a WWW server which causes a plurality of users to download the program file to implement the functional processing of the present invention is also incorporated in the present invention.

The program of the present invention may be encrypted, stored in a storage medium such as a CD-RON, and distributed to users. Any user who satisfies predetermined conditions can download key information to decrypt the program from a homepage through the Internet. The user can execute the encrypted program by using the key information and install the program in the computer.

The functions of the above-described embodiments are implemented not only when the readout program is executed by the computer but also when, e.g., the OS running on the computer performs part or all of actual processing based on the instructions of the program.

The functions of the above-described embodiments are also implemented when the program read out from the recording medium is written in the memory of a function expansion board inserted into the computer or a function expansion unit connected to the computer, and the CPU of the function expansion board or function expansion unit performs part or all of actual processing based on the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-092337, filed Mar. 29, 2006, and Japanese Patent Application No. 2007-042681, filed Feb. 22, 2007, which are hereby incorporated by reference herein in their entirety.

What is claimed is:

1. A print apparatus which prints image data on a recording sheet, comprising: a first calculation unit configured to calculate the number of printable sheets from the amount of remaining power in a battery of said print apparatus; a second calculation unit configured to calculate the number of printable sheets from the number of remaining recording sheets or the amount of remaining ink; a determination unit configured to determine the number of sheets printable by said print apparatus based on the number of printable sheets calculated by said first calculation unit and the number of printable sheets calculated by said second calculation unit; and a display unit configured to display the number of printable sheets determined by said determination unit, wherein before the start of a print operation, said determination unit determines, as the number of sheets printable by said print apparatus, the number of printable sheets calculated by said first calculation unit, and, after the start of the print operation, said second calculation unit calculates the number of printable sheets to cause said determination unit to determine the number of sheets printable by said print apparatus again based on the number of printable sheets calculated by said first calculation unit and the number of printable sheets calculated by said second calculation unit.

2. The apparatus according to claim 1, further comprising a designation unit configured to designate image data to be printed from image data stored in a recording medium, wherein when the number of sheets required to print all of the images corresponding to the designated image data exceeds the number of printable sheets, said display unit displays a message, indicating that not all the images corresponding to the designated image data designated by said designation unit can be printed, before the start of printing by said print apparatus.

3. The apparatus according to claim 2, further comprising an instruction unit configured to issue, even when the number of sheets required to print all of the images corresponding to the designated image data exceeds the number of printable sheets, an instruction to start printing image data, designated by said designation unit.

4. The apparatus according to claim 2, further comprising a setting unit configured to re-set, when the number of sheets required to print all of the images corresponding to the designated image data exceeds the number of printable sheets, the image data designated by said designation unit.

5. The apparatus according to claim 2, further comprising a unit configured to inhibit, when the number of sheets required to print all of the images corresponding to the designated image data exceeds the number of printable sheets, further image data designation by said designation unit.

6. The apparatus according to claim 5, further comprising a storage unit configured to store, when said designation unit designates image data requiring a larger number of sheets for printing images corresponding to all of the designated image data than the number of printable sheets, information of the designated image data.

7. The apparatus according to claim 2, further comprising a unit configured to continue, even when the number of sheets required to print all of the images corresponding to the designated image data exceeds the number of printable sheets, image data designation by said designation unit.

8. The apparatus according to claim 1, wherein when the number of sheets required to print all of the images corresponding to the designated image data exceeds the number of printable sheets calculated from the amount of remaining power in the battery, said display unit displays a warning message indicating that any one of the images corresponding to the designated image data cannot be printed due to the shortage of the amount of remaining power in the battery.

9. The apparatus according to claim 1, wherein when the number of sheets required to print all of the images corresponding to the designated image data exceeds the number of printable sheets calculated from the number of remaining recording sheets and the amount of remaining ink, said display unit displays a warning message indicating that any one of the images corresponding to the designated image data cannot be printed due to the shortage in the number of remaining recording sheets and/or of the amount of remaining ink, and a warning message prompting a user to feed additional recording sheets into the printer and/or replace the ink.

10. The apparatus according to claim 1, wherein said display unit displays the number of sheets required to print all of the images corresponding to the designated image data and the number of printable sheets.

11. The apparatus according to claim 1, wherein said print apparatus is a print apparatus which transfers ink applied on an ink sheet onto a recording sheet to print the image data, said print apparatus further comprises a detection unit configured to detect a rotation speed of a bobbin around which the ink sheet is wound, and said second calculation unit calculates the amount of remaining ink in accordance with a correspondence relationship between the detected rotation speed of the bobbin and the amount of remaining ink, and calculates the number of printable sheets from the calculated amount of remaining ink.

12. The apparatus according to claim 11, wherein the print operation comprises an ink-sheet convey operation.

13. The apparatus according to claim 1, wherein said display unit displays, when the number of printable sheets before the start of the print operation determined by said determination unit changes after the start of the print operation, a message indicating that the number of printable sheets has changed.

14. The apparatus according to claim 1, wherein said determination unit determines as the number of sheets printable by said print apparatus the smaller of the number of printable sheets calculated by said first calculation unit and the number of printable sheets calculated by said second calculation unit.

15. The apparatus according to claim 1, wherein said first calculation unit detects the amount of battery power remaining again after the start of the print operation to recalculate the number of printable sheets.

16. A control method for a print apparatus which prints image data on a recording sheet, comprising: a first calculation step of calculating the number of printable sheets from the amount of remaining power in a battery of the print apparatus; a second calculation step of calculating the number of printable sheets from the number of remaining recording sheets or the amount of remaining ink; a determination step of determining the number of sheets printable by the print apparatus based on the number of printable sheets calculated in said first calculation step and the number of printable sheets calculated in said second calculation step; and a display step of displaying, on a display, the number of printable sheets determined in said determination step, wherein before the start of a print operation, said determination step determines, as the number of sheets printable by the print apparatus, the number of printable sheets calculated by said first calculation step, and, after the start of the print operation, said second calculation step calculates the number of printable sheets to cause said determination step to determine the number of sheets printable by the print apparatus again based on the number of printable sheets calculated by said first calculation step and the number of printable sheets calculated by said second calculation step.

17. The method according to claim 16, wherein said determination step determines as the number of sheets printable by the print apparatus, the smaller of the number of printable sheets calculated by said first calculation unit and the number of printable sheets calculated by said second calculation unit.

18. A print system comprising: a print apparatus; and a digital camera directly communicating with said print apparatus, said print apparatus being configured to print image data stored in said digital camera, said print apparatus comprising: a first calculation unit configured to calculate the number of printable sheets from the amount of remaining power in a battery of said print apparatus; a second calculation unit configured to calculate the number of printable sheets from the number of remaining recording sheets or the amount of remaining ink; and a determination unit adapted to determine the number of sheets printable by said print apparatus based on the number of printable sheets calculated by said first calculation unit and the number of printable sheets calculated by said second calculation unit, and said digital camera comprising a display unit configured to display the number of printable sheets determined by said determination unit, wherein before the start of a print operation, said determination unit determines, as the number of sheets printable by said print apparatus, the number of printable sheets calculated by said first calculation unit, and, after the start of the print operation, said second calculation unit calculates the number of printable sheets to cause said determination unit to determine the number of sheets printable by said print apparatus again based on the number of printable sheets calculated by said first calculation unit and the number of printable sheets calculated by said second calculation unit.

19. The system according to claim 18, wherein said determination unit determines as the number of sheets printable by said print apparatus, the smaller of the number of printable sheets calculated by said first calculation unit and the number of printable sheets calculated by said second calculation unit.

20. A non transitory computer-readable medium storing a program for causing the computer to execute a control method defined in claim 16.

* * * * *